(12) United States Patent
Shudo et al.

(10) Patent No.: US 10,731,491 B2
(45) Date of Patent: Aug. 4, 2020

(54) SEALING STRUCTURE FOR TURBOCHARGER HOUSING

(71) Applicant: MITSUBISHI HEAVY INDUSTRIES, LTD., Tokyo (JP)

(72) Inventors: Shingo Shudo, Tokyo (JP); Daigo Watanabe, Tokyo (JP); Takumi Tokiyoshi, Tokyo (JP); Motoki Ebisu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 893 days.

(21) Appl. No.: 15/221,149

(22) Filed: Jul. 27, 2016

(65) Prior Publication Data

US 2017/0002672 A1    Jan. 5, 2017

Related U.S. Application Data

(62) Division of application No. 13/882,207, filed as application No. PCT/JP2011/078421 on Dec. 8, 2011, now Pat. No. 9,863,262.

(30) Foreign Application Priority Data

Dec. 15, 2010   (JP) .................. 2010-279922

(51) Int. Cl.
*F01D 11/00*   (2006.01)
*F16J 15/08*   (2006.01)
(Continued)

(52) U.S. Cl.
CPC ............ *F01D 11/003* (2013.01); *F01D 11/02* (2013.01); *F01D 25/00* (2013.01); *F01D 25/24* (2013.01);
(Continued)

(58) Field of Classification Search
CPC ........ F01D 25/243; F01D 25/16; F01D 25/24; F01D 25/242; F01D 11/003; F01D 11/005
See application file for complete search history.

(56) References Cited

U.S. PATENT DOCUMENTS 2,380,994 A    8/1945  Pummill
3,690,785 A *  9/1972  Lind .................. F01D 11/005
                                                          277/364
(Continued)

FOREIGN PATENT DOCUMENTS

CN    1307171 A    8/2001
CN    1818435 A    8/2006
(Continued)

OTHER PUBLICATIONS

Partial Supplementary European Search Report, dated Mar. 3, 2017, for corresponding European Application No. 11848082.1.
(Continued)

*Primary Examiner* — Justin D Seabe
*Assistant Examiner* — Cameron A Corday
(74) *Attorney, Agent, or Firm* — Birch, Stewart, Kolasch & Birch, LLP

(57) ABSTRACT

Bolt holes 16 are formed in a joint part 14 of a turbine housing 12, with flanged bolts 40 screwed in the bolt holes 16. A flange part 32 of a bearing housing 30 is sandwiched between bearing surfaces 44a of the flanged bolts 40 and an inner end face 14b of the joint part 14. A sealing ring 48 is interposed in an annular space s. Before the flanged bolts 40 are fastened, there is formed a height difference G equivalent to a compression allowance h for the sealing ring 48, between an outer end face 60a of the joint part 14 and a bolt receiving surface 32a of the flange part 32. The flanged bolts 40 are screwed into the bolt holes 16 until the bearing
(Continued)

surfaces 44a make tight contact with the outer end face 60a so as to resiliently deform the sealing ring 48.

2 Claims, 10 Drawing Sheets

(51) Int. Cl.
  *F16J 15/06* (2006.01)
  *F16J 15/447* (2006.01)
  *F01D 25/24* (2006.01)
  *F02C 6/12* (2006.01)
  *F01D 25/00* (2006.01)
  *F01D 11/02* (2006.01)

(52) U.S. Cl.
  CPC .............. *F02C 6/12* (2013.01); *F16J 15/062* (2013.01); *F16J 15/0887* (2013.01); *F16J 15/4472* (2013.01); *F16J 15/4476* (2013.01); *F05D 2220/40* (2013.01); *F05D 2240/55* (2013.01); *F05D 2260/231* (2013.01); *F05D 2260/31* (2013.01)

(56) References Cited

U.S. PATENT DOCUMENTS

| | | |
|---|---|---|
| 4,112,283 A | 9/1978 | Lathrop |
| 2009/0079140 A1 | 3/2009 | Achhammer et al. |
| 2009/0151348 A1 | 6/2009 | Hayashi et al. |

FOREIGN PATENT DOCUMENTS

| | | |
|---|---|---|
| CN | 200955435 Y | 10/2007 |
| CN | 101341318 A | 1/2009 |
| JP | 58-161131 U | 10/1983 |
| JP | 59-32132 U | 2/1984 |
| JP | 59-73538 U | 5/1984 |
| JP | 62-53692 B2 | 11/1987 |
| JP | 63-128243 U | 8/1988 |
| JP | 5-14780 U | 2/1993 |
| JP | 5-171948 A | 7/1993 |
| JP | 7-189723 A | 7/1995 |
| JP | 7-189724 A | 7/1995 |
| JP | 11-125120 A | 5/1999 |
| JP | 11-218269 A | 8/1999 |
| JP | 2002-115603 A | 4/2002 |
| JP | 2002-349444 A | 12/2002 |
| JP | 2003-214303 A | 7/2003 |
| JP | 2004-183653 A | 7/2004 |
| JP | 2006-132386 A | 5/2006 |
| JP | 2007-146862 A | 6/2007 |
| JP | 2008-128065 A | 6/2008 |
| JP | 4236792 B2 | 12/2008 |
| JP | 4345252 B2 | 7/2009 |
| JP | 2010-138885 A | 6/2010 |
| JP | 2010-209708 A | 9/2010 |

OTHER PUBLICATIONS

Partial Supplementary European Search Report effective May 19, 2017 issued to the corresponding EP Application No. 11848082.1.
U.S. Office Action dated Oct. 7, 2016 in related U.S. Appl. No. 13/882,207.
Office Action dated Apr. 6, 2017 in related U.S. Appl. No. 13/882,207.
Chinese Office Action issued in corresponding Chinese Application No. 201180052663.2 effective Nov. 24, 2014 with an English transiation.
International Preliminary Report on Patentability and Written Opinion of the International Searching Authority (Forms PCT/IB/338, PCT/IB/373, PCT/ISA/237 and PCT/IB/326) for International Application No. PCT/JP2011/078421, dated Jun. 27, 2013 with English translation.
Japanese Office Action dated May 29, 2015. for Japanese Application No. 2010-279922, along with an English translation.
Reconsideration Report effective Dec. 3, 2014 issued in the corresponding JP Application No. 2010-279922 with an English Translation.
Chinese Office Action effective Nov. 30, 2015 issued to the corresponding Chinese Divisional Application No. 201510167260.2 with an English Translation.
Japanese Decision to Grant a Patent dated Aug. 28, 2015, for Japanese Application No. 2014-223094 with the English Translation.
Notice of Allowance effective Jan. 19, 2016 issued in the corresponding Chinese Application No. 201180052663.2 with an English translation.
Extended European Search Report effective Oct. 2, 2017 issued to the corresponding EP Application No. 17176825.2.

* cited by examiner

SEALING STRUCTURE FOR TURBOCHARGER HOUSING

This application is a Divisional of copending application Ser. No. 13/882,207, filed on May 17, 2013, which was filed as PCT International Application No. PCT/JP2011/078421 on Dec. 8, 2011, which claims the benefit under 35 U.S.C. § 119(a) to Patent Application No. 2010-279922, filed in Japan on Dec. 15, 2010, all of which are hereby expressly incorporated by reference into the present application.

TECHNICAL FIELD

The present invention relates to a sealing structure for sealing joint surfaces of a turbine housing and a bearing housing of a turbocharger.

BACKGROUND ART

The turbine housing and the bearing housing of a turbocharger are joined to each other at a joint with bolts or the like. Joint surfaces at the joint need to be sealed so that exhaust gas flowing inside the turbine housing does not leak to the outside. Therefore, a sealing ring having a semicircular, or C-shaped, or V-shaped cross section is usually interposed between the joint surfaces. These sealing rings or gaskets receive pressure of exhaust gas on the inner side and are pressed against the accommodating surface by the pressure, thereby exhibiting the sealing performance.

There are possibilities, however, that plastic deformation of the sealing rings caused by a fastening force of the bolts, or thermal expansion of the joint caused by the high-temperature exhaust gas flowing into the turbine housing, may create a gap in the joint and lead to a gas leak.

Patent Document 1 discloses sealing means in which a gasket is interposed in a joint between a turbine housing and a bearing housing. The structure of this sealing means will be described with reference to FIG. 9. In FIG. 9, the turbine housing 102 and the bearing housing 104 form the housing of a turbocharger 100, and a turbine shaft 106 and turbine blades 108 coupled to the turbine shaft 106 are arranged inside the housing. The turbine shaft 106 is connected to compressor blades (not shown). The bearing housing 104 accommodates therein a bearing 110 that rotatably supports the turbine shaft 106.

Exhaust gas e flowing into a spirally shaped scroll passage 112 formed inside the turbine housing 102 rotates the turbine blades 108 and the turbine shaft 106. This in turn rotates the compressor blades coupled to the turbine shaft 106, to charge air to the engine. A heat shielding plate 116 is interposed between the scroll passage 112 and the bearing housing 104 so as to form a heat insulating space 118 on the side of the bearing housing 104 of the heat shielding plate 116.

The turbine housing 102 is joined to a flange part 114 integrally formed to the bearing housing 104 with bolts 120, and a gasket 126 is interposed between the joint surface 122 of the turbine housing 102 and the joint surface 124 of the flange part 114. This gasket 124 provides a seal between the joint surfaces 122 and 124.

Patent Document 2 discloses another structure of a joint between a turbine housing and a bearing housing. The structure of this joint will be described below with reference to FIG. 10. In a turbocharger 200 shown in FIG. 10, the turbine housing 202 includes a recess 204, in which a flange part 212 formed around the bearing housing 210 is fitted.

The flange part 212 protrudes from the recess 204 so that there is a height difference G from an end face 206 of the turbine housing 202.

A hole 208 is drilled in the end face 206 of the turbine housing 202, this hole being formed with an internal thread 209. A bolt 220 is meshed with the internal thread 209, with a washer 224 being interposed between the bearing surface 222 of the fastening bolt head and the end face 206 of the turbine housing 202. The washer 224 is placed on the surfaces with a height difference G in a tilted manner. The washer 224 here is resiliently deformed by the fastening force of the fastening bolt 220 to apply tension to the fastening bolt 220.

Thus the axial force of the bolt 220 is raised, to prevent a drop in the axial force during the operation, and to fasten the turbine housing 202 and the bearing housing 204 together even more firmly.

Patent Document 1: Japanese Patent Application Laid-open No. H7-189723
Patent Document 2: Japanese Patent Application Laid-open No. 2010-209708

The temperature of gas combustion in engines has increased over the years for better engine output. Thermal expansion of the turbine housing, bearing housing, etc., caused by the exhaust gas is accordingly larger, and the risk of gas leak through joints of these housings is higher.

With the sealing means disclosed in Patent Document 1, thermal expansion of the turbine housing 102 and the bearing housing 104 during the operation of the turbocharger 100 is not taken into account, and therefore there is a possibility that gas may leak through a gap that may be created in the joint when these housings experience thermal expansion.

The joint disclosed in Patent Document 2 is configured such that there is a height difference G between the flange part 212 and the end face 206 of the turbine housing 202, so that there is a gap between the end face 206 and the washer 224, or between the bearing surface 222 of the fastening bolt 220 and the washer 224. There is thus the problem that the sealing properties at the joint of the housing cannot be improved.

DISCLOSURE OF THE INVENTION

In view of these problems in the conventional techniques, it is a first object of the present invention to improve the sealing properties at a joint between a turbine housing and a bearing housing to withstand the increasingly higher temperature of exhaust gas in recent years. A second object of the invention is to simplify the structure of the joint and to provide housing components with more versatility to allow wider application thereof, as well as to make the machining process of the joint easier and reduce the machining cost.

To achieve these objects, the sealing structure for a turbocharger according to the present invention is a sealing structure for sealing joint surfaces of a turbine housing and a bearing housing of a turbocharger. The turbine housing has an end face including an inner end face that makes contact with a flange part of the bearing housing and forms a sealing surface, and an outer end face that does not form a sealing surface with the flange part of the bearing housing and has a height difference from the inner end face of the turbine housing and from a bolt receiving surface of the flange part. An element forming the sealing surface is formed by a resiliently deformable member. The flange part of the bearing housing is sandwiched between a bearing surface of a head of a bolt screwed in the end face of the turbine housing and the inner end face of the turbine housing. A compression allowance for the sealing surface forming element to resiliently deform is set by a height difference between the flange part and the outer end face of the turbine housing formed before the bolt is fastened.

As the flange part of the bearing housing is sandwiched between the bearing surface of the bolt head and the inner end face of the turbine housing, the sealing properties are maintained high at the joint surfaces, while thermal deformation of the turbine housing and the bearing housing is tolerated.

The outer end face of the turbine housing has a height difference from the bolt receiving surface of the flange part of the bearing housing, so that, when the bolt is fastened, the sealing surfaces formed between the flange part and the inner end face of the turbine housing are pressed and resiliently deformed in the amount of the compression allowance corresponding to the height difference. Thus, the sealing properties can be maintained high at the sealing surfaces even though the sealing surface forming element undergoes thermal deformation, as such thermal deformation is tolerated.

As the compression allowance for the sealing surface forming element to resiliently deform is set by a height difference that is formed between the flange part and the outer end face of the turbine housing before the bolt is fastened, the compression allowance can be readily set such as to achieve the best sealing properties.

Since the flange part of the bearing housing is sandwiched between the bearing surface of the bolt head and the inner end face of the turbine housing, no bolt holes or the like need to be formed in the flange part of the bearing housing. This makes the machining of the flange part of the bearing housing easy, and enables a cost reduction in the machining. Also, the bearing housing will have more versatility and can be used in wider applications.

In the sealing structure of the present invention, preferably, a resiliently deformable sealing ring may be interposed on the sealing surface, and a height difference corresponding to the compression allowance for the sealing ring may be formed between the flange part of the bearing housing and the outer end face of the turbine housing before the bolt is fastened.

Thereby, the sealing ring is pressed and resiliently deformed by the amount of compression allowance when the bolt is fastened, so that the sealing properties can be maintained high at the sealing surfaces even if the sealing surface forming element undergoes thermal deformation. As it is only the sealing ring that is resiliently deformed, the turbine housing or the bearing housing need not be resiliently deformed. This gives a higher degree of freedom in selecting the material for the turbine housing or the bearing housing.

In addition to the structure described above, preferably, a gas entrance prevention wall may be provided between the sealing ring and a gas passage formed inside the turbine housing. Such a gas entrance prevention wall will reduce thermal deformation of the sealing surface forming element, whereby the sealing properties are improved even more at the sealing surfaces. Also, the wall will shut off the heat of the exhaust gas and prevent thermal degradation of the sealing ring.

In the sealing structure of the present invention, preferably, the flange part of the bearing housing may be formed of a plate spring, and a height difference corresponding to the compression allowance for the plate spring may be formed between the plate spring and the outer end face of the turbine housing. Thereby, the plate spring ensures the sealing properties at the joint part through resilient deformation thereof. A sealing member such as a sealing ring or the like is made unnecessary, so that the sealing structure can be simplified.

In the sealing structure of the present invention, preferably, the inner end face of the turbine housing and the opposite surface of the flange part of the bearing housing may be formed as tapered surfaces, and portions forming the tapered surfaces may be formed by resiliently deformable members.

Thereby, thermal deformation of the sealing surface forming element can be absorbed by both tapered surfaces sliding on each other, so that the sealing properties can be maintained high at the sealing surfaces even if the sealing surface forming element undergoes thermal deformation. As the structure of the sealing surfaces is made simpler, no special sealing members are necessary.

The sealing structure of the present invention may further include a tapered protrusion formed on at least one of a joint surface of the flange part of the bearing housing or the inner end face of the turbine housing. The protrusion makes line contact with an opposite joint surface, and a height difference corresponding to the compression allowance for the protrusion may be formed between the flange part and the outer end face of the turbine housing.

Thereby, the fastening force of the bolt can generate a large linear pressure between the protrusion and the opposite surface. Thus the sealing properties can be maintained high at the sealing surfaces even if the sealing surface forming element undergoes thermal deformation. The sealing structure can be made simpler, as no special sealing members are necessary.

The sealing structure of the present invention may further include a labyrinth structure formed by a joint surface of the flange part of the bearing housing and the inner end face of the turbine housing, and portions forming the labyrinth structure may be formed by resiliently deformable members.

The labyrinth structure formed at the sealing surfaces provides an effect of reducing gas pressure, so that the sealing properties can be maintained high even if the sealing surface forming element undergoes thermal deformation. The sealing structure can be made simpler, as no special sealing members are necessary.

In the sealing structure of the present invention, preferably, the bolt head may include an integral or a separate flange or a washer that makes contact with the flange part of the bearing housing for an increase in contact area to contact with the flange part. Thereby, the contact area between the bolt bearing surface and the flange part can be made larger, so that the bolt can be fastened to the flange part more tightly and the flange part can be held more firmly.

According to the present invention, in the sealing structure for sealing joint surfaces of a turbine housing and a bearing housing of a turbocharger, the turbine housing has an end face including an inner end face that makes contact with a flange part of the bearing housing and forms a sealing surface, and an outer end face that does not form a sealing surface with the flange part and has a height difference from the inner end face of the turbine housing and from a bolt receiving surface of the flange part. An element forming the sealing surface is formed by a resiliently deformable member. The flange part of the bearing housing is sandwiched between a bearing surface of a head of a bolt screwed in the end face of the turbine housing and the inner end face of the turbine housing. A compression allowance for the sealing surface forming member to resiliently deform is set by a height difference between the bolt receiving surface of the flange part and the outer end face of the turbine housing formed before the bolt is fastened. Thereby, the sealing properties can be maintained high at the joint surfaces, while thermal deformation of the turbine housing and the bearing housing is tolerated.

The compression allowance to achieve optimal sealing properties can be set easily, the machining of the flange part of the bearing housing is made easy, the machining cost is reduced, and the bearing housing can have more versatility.

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

Embodiment 1

Figure 1:
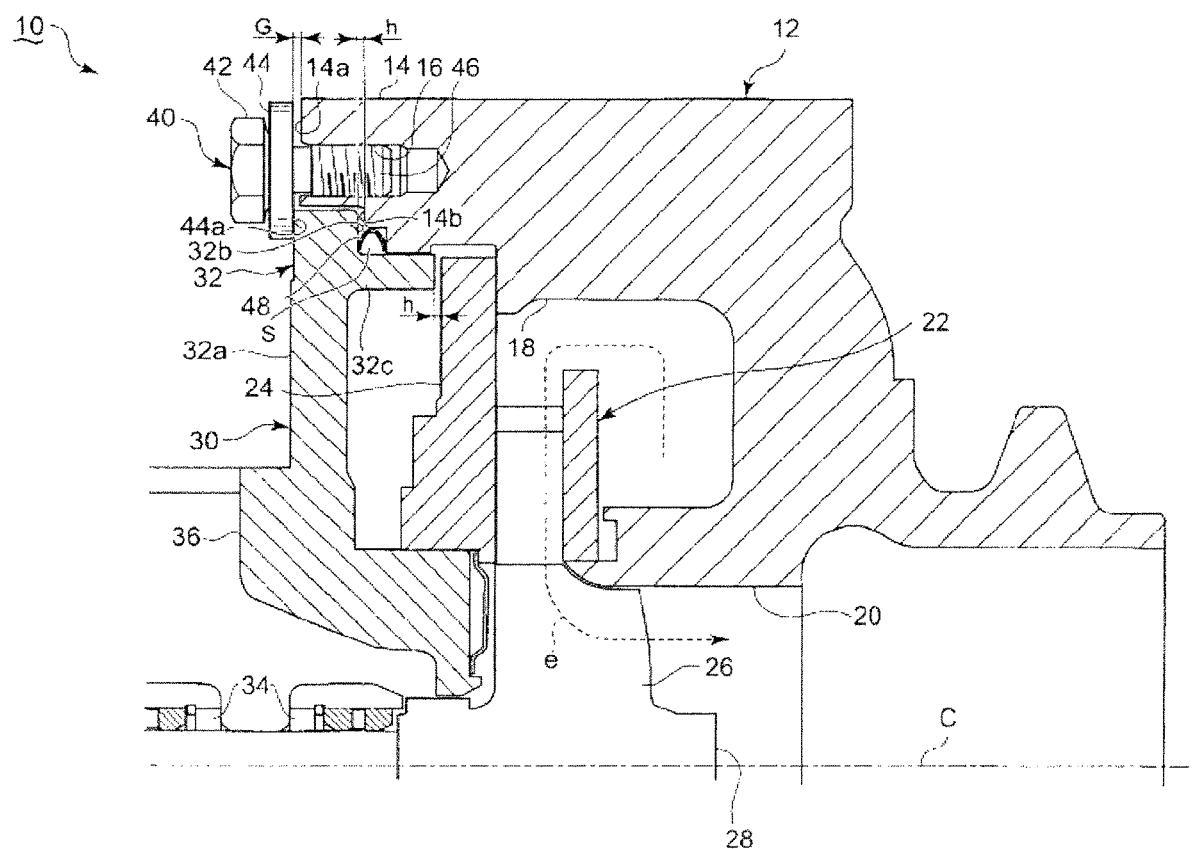
FIG. 1 is a cross-sectional view of a turbocharger housing according to a first embodiment of the apparatus of the present invention.

A first embodiment of the apparatus of the present invention will be described with reference to FIG. 1. In a turbocharger 10 shown in FIG. 1, a joint part 14 of a turbine housing 12 and a flange part 32 of a bearing housing 30 are united with flanged bolts 40. Inside the turbine housing 12 is a spirally shaped scroll passage 18 formed by a nozzle plate 22 and a nozzle mount 24 for exhaust gas e to flow in.

A turbine shaft 28 is arranged along a center axial line C of the turbine housing 12, with a plurality of turbine blades 26 formed integrally on the turbine shaft 28. Exhaust gas e flowing from the scroll passage 18 toward the turbine blades 26 rotates the turbine blades 26 and the turbine shaft 28 and exits through an outlet passage 20.

The bearing housing 30 includes bearings 34 that rotatably support the turbine shaft 28 and a lubricating oil passage 36 for supplying lubricating oil to the bearings 34. The joint part 14 of the turbine housing 12 includes a plurality of bolt holes 16 arranged in the circumferential direction of the turbine housing 12. The flanged bolt 40 includes a disc-shaped flange 44 integrally formed on the underside of a hexagonal bolt head 42. An external thread 46 meshes with the bolt hole 16, so that the underside of the flange 44 is pressed against the flange part 32 of the bearing housing 30, to unite the turbine housing 12 and the bearing housing 30.

An annular space s with a rectangular cross section is formed between an inner end face 14b of the turbine housing 12 and a backside 32b of the flange part 32. A sealing ring 48 is interposed in this annular space s. The sealing ring 48 has an approximately semi-circular cross section, and is configured to be resiliently deformable. FIG. 1 shows a state before the flanged bolts 40 are fastened. In this state, the sealing ring 48 is not resiliently deformed yet, and there is a height difference in an amount corresponding to a compression allowance h for the sealing ring 48, between a bolt receiving surface 32a of the flange part 32 and an outer end face 14a of the turbine housing 12.

The backside 32b of the flange part 32 and the inner end face 14b of the turbine housing 12, and a heat shielding wall 32c integral with the flange part 32 and the nozzle mount 24, are separated from each other by a distance corresponding to the compression allowance h for the sealing ring 48. When the flanged bolts 40 are screwed into the bolt holes 16 in this state, and the bearing surfaces 44a of the flanges 44 are brought into tight contact with the outer end face 14a, the gaps at three locations are closed, and the sealing ring 48 undergoes resilient deformation in the amount of the compression allowance h. In this state, the flange part 32 is sandwiched between the flanges 44 and the inner end face 14b of the turbine housing 12. The sealing ring 48 makes pressure contact with the backside 32b of the flange part 32 and the inner end face 14b on one end and on the other, respectively.

According to this embodiment, as the flange part 32 is sandwiched between the inner side of the bearing surfaces 44a of the flanges 44 and the inner end face 14b of the turbine housing 12, the sealing properties are maintained high at the sealing surfaces, which are formed between the bearing surfaces 44a of the flanges 44 and the bolt receiving surface 32a of the flange part 32 and the outer end face 14a, and between the backside 32b of the flange part 32 and the inner end face 14b, while thermal deformation of the joint part 14 and the flange part 32 is tolerated.

A height difference G is formed between the bolt receiving surface 32a of the flange part 32 and the outer end face 14a, and the sealing ring 48 is pressed and resiliently deformed in the amount of the compression allowance h that corresponds to the height difference G after the flanged bolts 40 are fastened, so that, even if thermal deformation occurs around the sealing ring 48, such thermal deformation is tolerated, while the sealing properties are maintained high at the sealing surfaces.

As the compression allowance h for the sealing ring 48 to resiliently deform is set by a height difference G that is formed before the flanged bolts 40 are fastened, the compression allowance h for the sealing ring 48 can be readily set such as to achieve the best sealing properties.

Since the flange part 32 is sandwiched between the bearing surfaces 44a of the flanges 44 and the inner end face 14b, no bolt holes or the like need to be provided in the flange part 32. This makes the machining of the flange part 32 easy, and enables a cost reduction in the machining. Also, the bearing housing will have more versatility and can be used in wider applications.

Furthermore, in this embodiment, the heat shielding wall 32c provided to divide the inner space of the housing and the sealing ring 48 prevents thermal degradation of the sealing ring 48 and ensures longer life of the sealing ring 48. The heat shielding wall 32c further improves the sealing properties at the sealing surfaces.

While flanged bolts 40 having a bolt head 42 and a flange 44 in one piece are used in this embodiment, bolts with a flange or a washer formed independently of the bolt head may be used instead.

Embodiment 2

Figure 2:
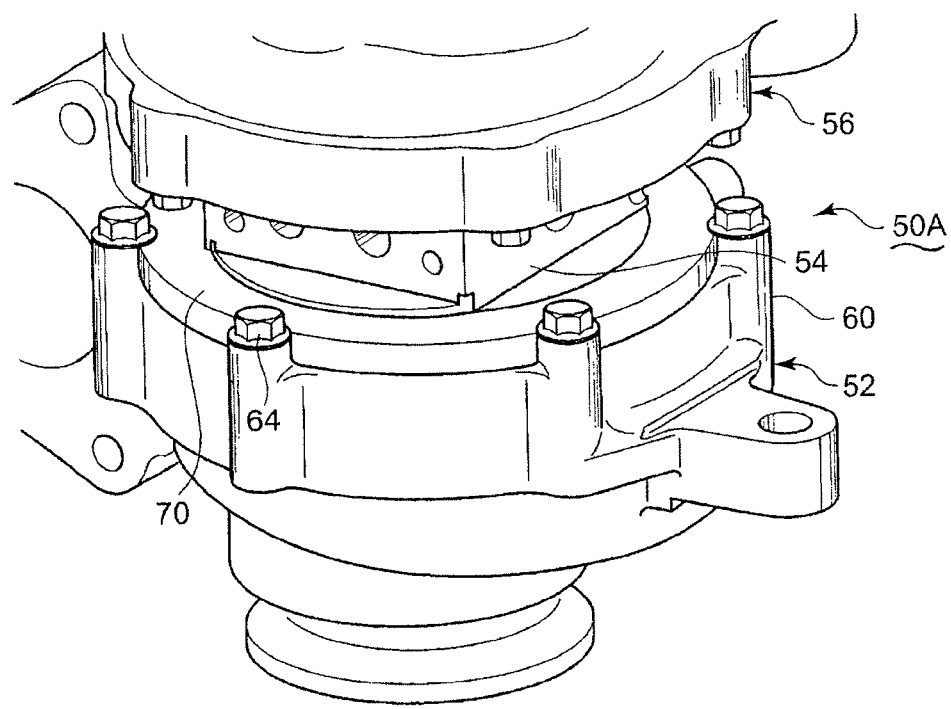
FIG. 2 is a perspective view of a turbocharger housing according to a second embodiment of the apparatus of the present invention.

Next, a second embodiment of the apparatus of the present invention will be described with reference to FIG. 2 and FIG. 3. As shown in FIG. 2, the housing of a turbocharger 50A of this embodiment is formed by a turbine housing 52, a bearing housing 54, and a compressor housing 56. A plurality of joint parts 60 are formed along the circumference of the turbine housing 52, with bolt holes 62 drilled in these joint parts 60 such as to open in an outer end face 60a, as shown in FIG. 3.

Figure 3:
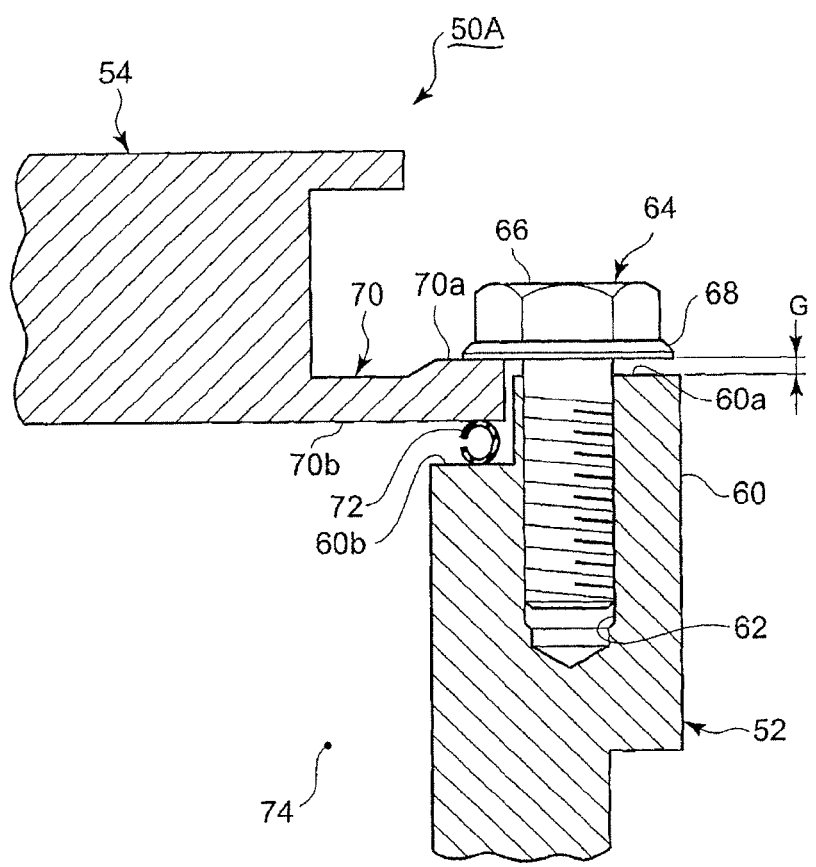
FIG. 3 is an enlarged partial cross-sectional view of the second embodiment.

As shown in FIG. 3, flanged bolts 64 are screwed in the bolt holes 62. The flanged bolt 64 has a hexagonal bolt head 66, and a disc-shaped flange 68 having a larger diameter than the bolt head integrally formed therewith. A height difference is formed between the outer end face 60a and an inner end face 60b of the turbine housing 52. The bearing housing 54 includes an integrally formed flange part 70. A resiliently deformable sealing ring 72 having a C-shaped cross section is interposed between the flange part 70 and the inner end face 60b.

FIG. 3 shows a state before the flanged bolts 64 are fastened. Before the fastening, there is a height difference G between the outer end face 60a and the bolt receiving surface 70a of the flange part 70. The height difference G is set the same as a compression allowance for the sealing ring 72. When the flanged bolts 64 are screwed in until the flanges 68 make tight contact with the outer end face 60a, the height difference G is flattened out. At the same time, the sealing ring 72 is pressed by the backside 70b of the flange part 70 and the inner end face 14b, and resiliently deformed in the amount of predetermined compression allowance.

According to this embodiment, with the sealing ring 72 that undergoes resilient deformation, the sealing properties are maintained high at the sealing surfaces, which are formed between the bolt receiving surface 70a or backside 70b of the flange part 70, and the outer end face 60a and inner end face 14b of the turbine housing 52, even if the flange part 70 or the joint part 60 undergoes thermal deformation by the heat of the exhaust gas passing through the exhaust gas passage 74.

As the flange part 70 does not include bolt holes or the like, the flange part 70 can have a simple shape, so that the bearing housing 54 can be used in wider applications. Also, as the compression allowance for the sealing ring 72 is set the same as the height difference G, an optimal compression allowance for the sealing ring 72 to achieve desired sealing properties can be readily set.

Embodiment 3

Figure 4:
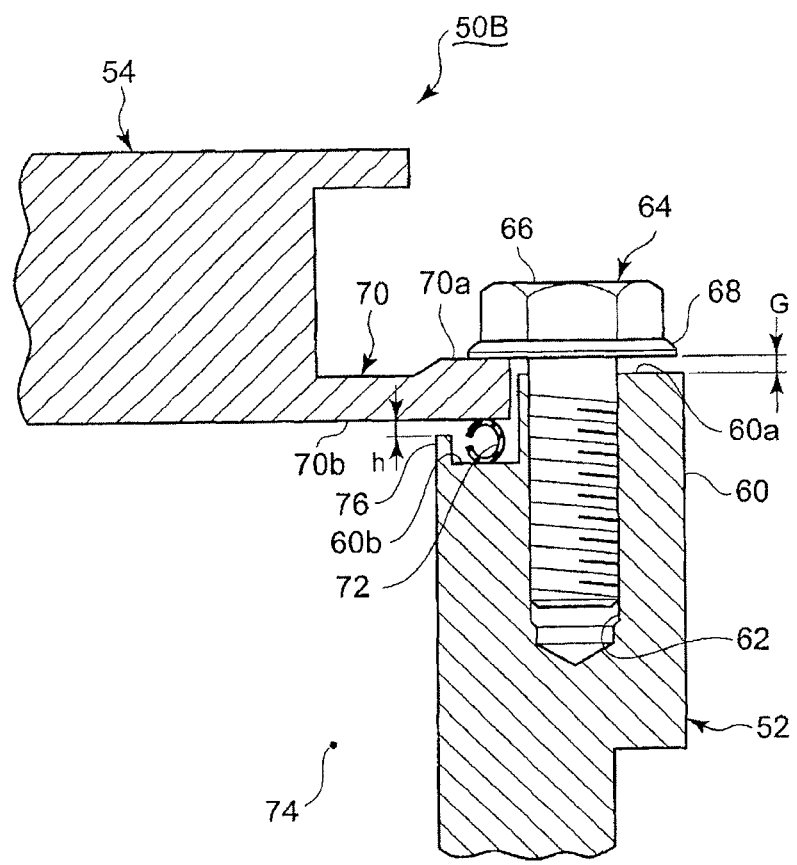
FIG. 4 is an enlarged partial cross-sectional view of a turbocharger housing according to a third embodiment of the apparatus of the present invention.

Next, a third embodiment of the apparatus of the present invention will be described with reference to FIG. 4. A turbocharger 50B of this embodiment includes a heat shielding wall 76 integrally formed on the inner end face 60b between the exhaust gas passage 74 and the sealing ring 72. The distance h between the heat shielding wall 76 and the backside 70b of the flange part 70 is set the same as the height difference G and the predetermined compression allowance for the sealing ring 72. The structure is otherwise the same as that of the previously described second embodiment.

In this structure, when the flanged bolts 64 are screwed in until the flanges 68 make tight contact with the outer end face 60a, the heat shielding wall 76 makes tight contact with the backside 70b of the flange part 70 at the same time, and the sealing ring 72 resiliently deforms in the amount of predetermined compression allowance. Thus, in addition to the advantageous effects similar to those of the second embodiment, the heat shielding wall 76 prevents exhaust gas from reaching the sealing ring 72. Heat degradation of the sealing ring 72 is thus prevented so that the sealing ring 72 can have longer life, and also, the heat shielding wall 76 further enhances the sealing properties at the sealing surfaces.

Embodiment 4

Figure 5:
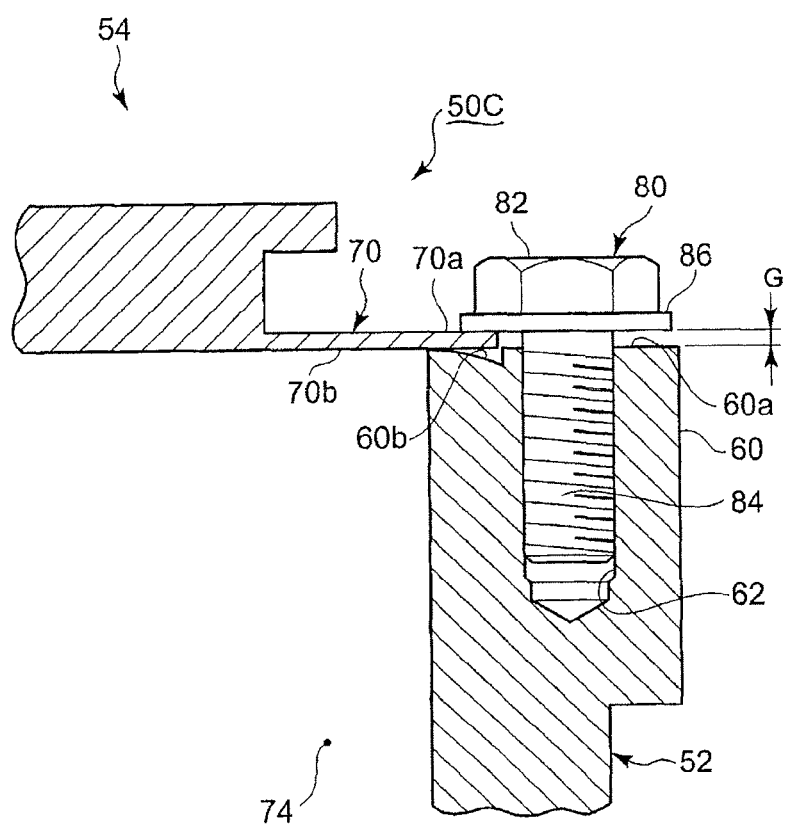
FIG. 5 is an enlarged partial cross-sectional view of a turbocharger housing according to a fourth embodiment of the apparatus of the present invention.

Next, a fourth embodiment of the apparatus of the present invention will be described with reference to FIG. 5. In a turbocharger 50C of this embodiment, the bolt 80 has a washer 86 separately formed from the bolt head 82 and the external thread 84. The flange part 70 of the bearing housing 54 is formed by a plate spring. A height difference is formed between an outer end face 60a and an inner end face 60b of the turbine housing 52. There is a height difference G between the flange part 70 and the outer end face 60a before the bolts 80 are fastened.

When the bolts 80 are screwed into the bolt holes 62, and the washers 86 are brought into tight contact with the outer end face 60a, the flange part 70 is pressed by the washers 86 and resiliently deformed to contact the inner end face 60b. The inner end face 60b is formed as a curved surface that conforms to the backside shape after the resilient deformation of the flange part 70.

According to this embodiment, as the backside 70a of the flange part 70 makes tight contact with the inner end face 60b, the sealing properties can be maintained high at the sealing surfaces even though the sealing surface forming member undergoes deformation by the heat of the exhaust gas. Since the flange part 70 is formed by a plate spring, it has resiliency and can readily form a sealing surface, as well as good heat resistance so that the flange part can have longer life even under the high temperature of exhaust gas.

Embodiment 5

Figure 6:
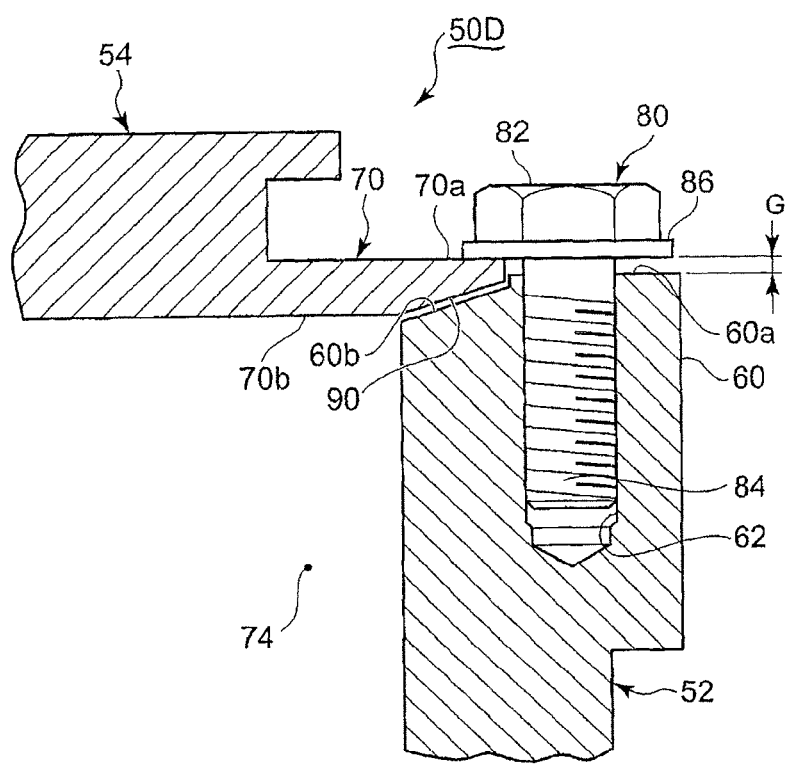
FIG. 6 is an enlarged partial cross-sectional view of a turbocharger housing according to a fifth embodiment of the apparatus of the present invention.

Next, a fifth embodiment of the apparatus of the present invention will be described with reference to FIG. 6. In a turbocharger 50D of this embodiment, the inner end face 60b of the turbine housing 52 is formed as a flat tapered surface, while the distal end of the backside 70b of the flange part 70 opposite the inner end face 60b is formed as a flat tapered surface 90 inclined at the same angle as that of the inner end face 60b. The inner end face 60b and the tapered surface 90 of the flange part 70 are inclined at the same angle so that they will entirely abut with each other. The portions forming the tapered surfaces of the flange part 70 and the joint part 60 are made of a resilient material. The structure is otherwise the same as that of the previously described fourth embodiment.

In this structure, before the bolts 80 are fastened, there is a height difference G between the outer end face 60a and the bolt receiving surface 70a of the flange part 70. When the bolts 80 are screwed in until the washers 86 make tight contact with the outer end face 60a, the inner end face 60b and the tapered surface 90 make tight contact with each other, with the portions forming the tapered surfaces resiliently deforming to press each other, and the bolt receiving surface 70a of the flange part 70 becomes coplanar with the outer end face 60a.

According to this embodiment, with a simple structure in which the inner end face 60b and the distal end of the backside 70b of the flange part 70 are formed as tapered surfaces 90, the sealing properties can be maintained high at the sealing surfaces even if the flange part 70 or the joint part 60 undergoes thermal deformation.

Embodiment 6

Figure 7:
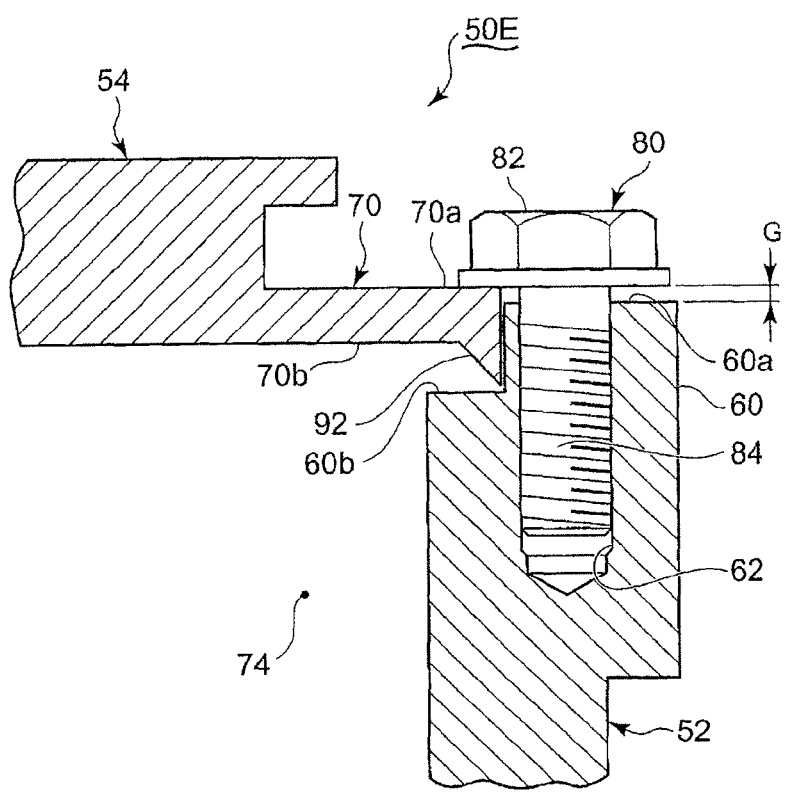
FIG. 7 is an enlarged partial cross-sectional view of a turbocharger housing according to a sixth embodiment of the apparatus of the present invention.

Next, a sixth embodiment of the apparatus of the present invention will be described with reference to FIG. 7. In a turbocharger 50E of this embodiment, a protrusion 92 having a tapered, wedge-shaped cross section is formed at the tip of the backside 70b of the flange part 70. Before the bolts 80 are fastened, when the tip of the protrusion 92 touches the inner end face 60b, there is a height difference G formed between the bolt receiving surface 70a of the flange part 70 and the outer end face 60a. The structure is otherwise the same as that of the previously described fifth embodiment.

In this structure, when the bolts 80 are screwed in until the washers 86 make tight contact with the outer end face 60a, the tip of the protrusion 92 is pressed against the inner end face 60b, and remains in pressure contact with the inner end face 60b as it resiliently deforms. The sealing properties can thus be maintained high at the sealing surfaces even if the flange part 70 or the joint part 60 undergoes deformation by the heat of the exhaust gas passing through the exhaust gas passage 74. The structure is so simple, with just the protrusion 92 formed on the backside 70b of the flange part 70.

Embodiment 7

Figure 8:
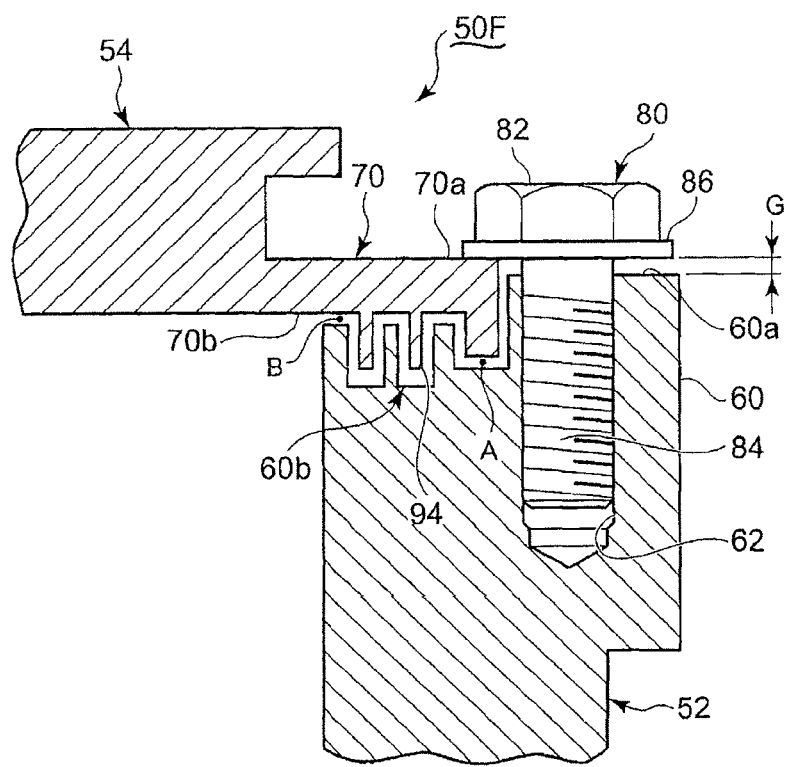
FIG. 8 is an enlarged partial cross-sectional view of a turbocharger housing according to a seventh embodiment of the apparatus of the present invention.
Figure 9:
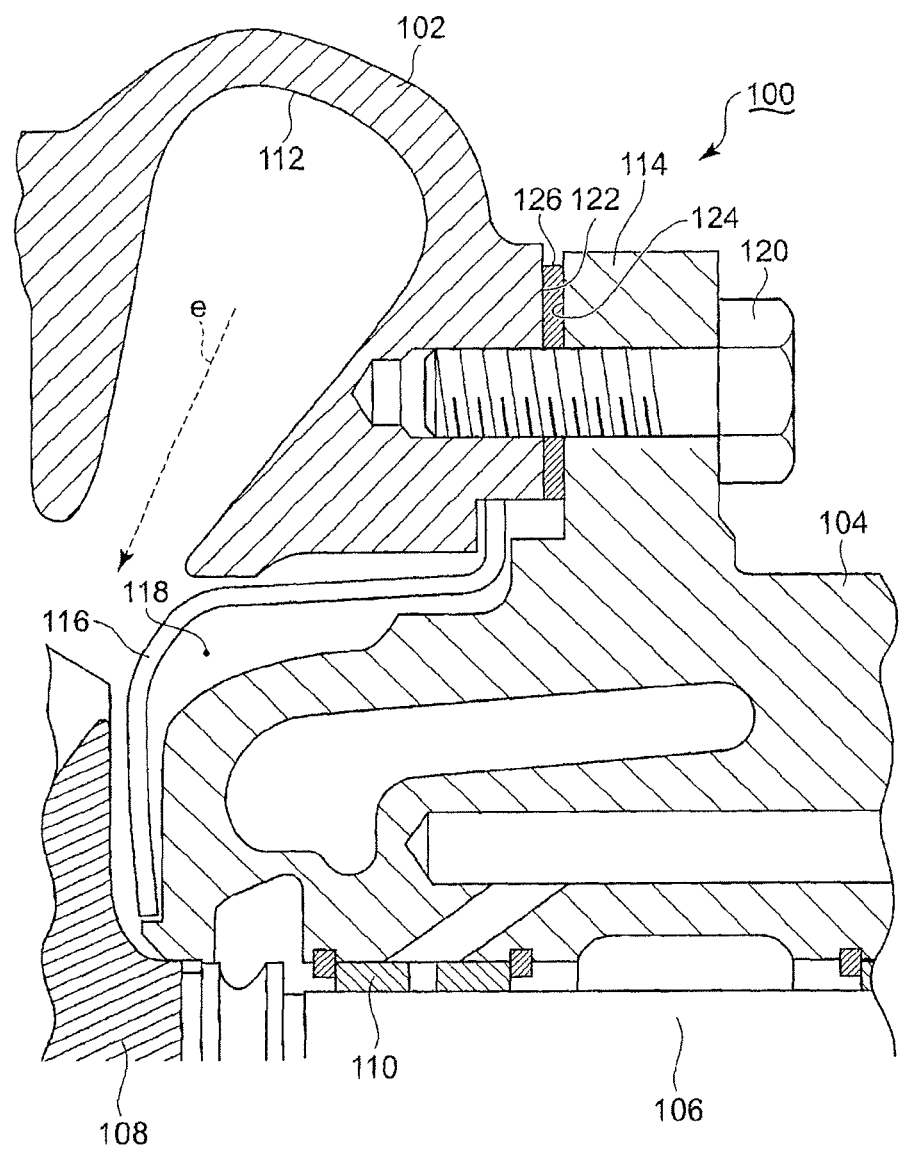
FIG. 9 is a cross-sectional view of a conventional turbocharger housing.
Figure 10:
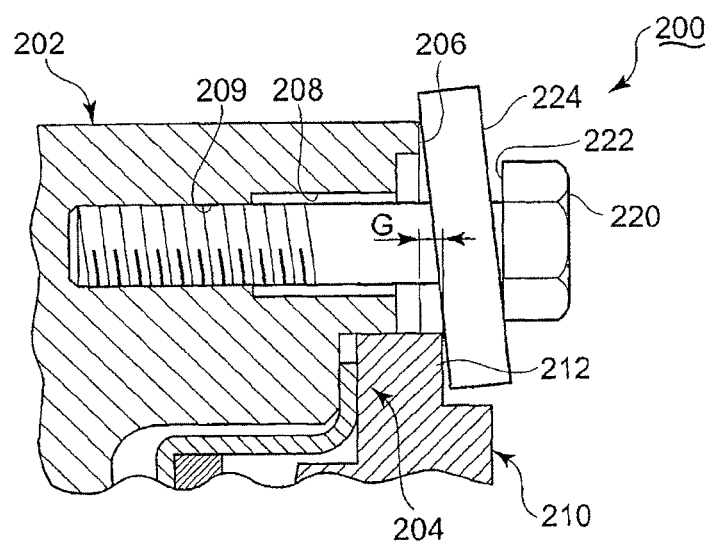
FIG. 10 is an enlarged partial cross-sectional view illustrating another structure of a conventional turbocharger housing.

Next, a seventh embodiment of the apparatus of the present invention will be described with reference to FIG. 8. A turbocharger 50F according this embodiment includes a labyrinth structure 94 on the backside 70b of the flange part 70 and the inner end face 60b of the turbine housing 52. The structure is otherwise the same as that of the previously described sixth embodiment. FIG. 8 shows a state before the bolts 80 are fastened, where there is a height difference G between the bolt receiving surface 70a of the flange part 70 and the outer end face 60a. Gaps A and B of the same size as the height difference G are formed on both left and right sides of the labyrinth structure 94.

In this structure, when the bolts 80 are screwed in until the washers 86 make tight contact with the outer end face 60a, the height difference G between the bolt receiving surface 70a of the flange part 70 and the outer end face 60a is flattened out. At the same time, the gaps A and B are closed so that the labyrinth structure 94 is tightly sealed at both ends.

According to this embodiment, after the bolts 80 are fastened, the gaps A and B are sealed, and there is the labyrinth structure 94 between the gaps A and B, so that the sealing properties are maintained well at the sealing surfaces even if the flange part 70 and the joint part 60 may undergo thermal deformation.

INDUSTRIAL APPLICABILITY

According to the present invention, a turbocharger housing capable of exhibiting better sealing properties at the joint surfaces of the housing can be realized with a simple structure, despite the thermal deformation the housing parts may undergo.

The invention claimed is:

1. A sealing structure for sealing joint surfaces of a turbine housing and a bearing housing of a turbocharger, comprising:
    an end face of the turbine housing including an inner end face in contact with a flange part of the bearing housing and forming a sealing surface, and an outer end face that does not form a sealing surface with the flange part, said outer end face having a height difference from the inner end face and from a bolt receiving surface of the flange part;
    a resiliently deformable member forming the sealing surface, wherein the resiliently deformable member is sandwiched between the inner end face and a bearing surface of a head of a bolt screwed in the outer end face of the turbine housing, the resiliently deformable member and the flange part being monolithic;
    wherein a compression allowance for the resiliently deformable member to resiliently deform is set by a height difference between the flange part and the outer end face formed before the bolt is fastened, and
    said sealing structure further comprising:
    a heat shielding wall integrally formed on a backside of the flange part to shield the resiliently deformable member from an inner space of the turbine housing.

2. The sealing structure according to claim 1, wherein the resiliently deformable member of the flange part is formed of a plate spring, and a height difference corresponding to the compression allowance for the plate spring is formed between the plate spring and the outer end face of the turbine housing.

* * * * *